(12) United States Patent
Nishimaki

(10) Patent No.: US 7,055,494 B2
(45) Date of Patent: Jun. 6, 2006

(54) LOW HEAT GENERATION FUEL INJECTION SYSTEM

(75) Inventor: Hiroaki Nishimaki, Kariya (JP)

(73) Assignee: Denso Corporation, (JP)

(*) Notice: Subject to any disclaimer, the term of this patent is extended or adjusted under 35 U.S.C. 154(b) by 0 days.

(21) Appl. No.: 11/007,177

(22) Filed: Dec. 9, 2004

(65) Prior Publication Data
US 2005/0126535 A1   Jun. 16, 2005

(30) Foreign Application Priority Data
Dec. 12, 2003   (JP) .............................. 2003-415431

(51) Int. Cl.
*F02B 3/00* (2006.01)
(52) U.S. Cl. ...................... 123/299; 123/478
(58) Field of Classification Search ................ 123/299, 123/478, 480; 60/284, 285
See application file for complete search history.

(56) References Cited
U.S. PATENT DOCUMENTS
4,215,659 A * 8/1980 Lowther ...................... 123/68
2003/0221423 A1* 12/2003 Kosaka et al. ................ 60/297

FOREIGN PATENT DOCUMENTS
JP   8232740   9/1996
JP   9060541   3/1997

* cited by examiner

*Primary Examiner*—John T. Kwon
(74) *Attorney, Agent, or Firm*—Nixon & Vanderhye PC

(57) ABSTRACT

When an electronic control unit (ECU) performs post-injection operation, the ECU intermittently implements a post-injection suspending pattern for suspending output of a post-injection command signal after outputting a normal injection command signal. The ECU implements the post-injection suspending pattern in non-overlapping cylinders and certain overlapping cylinders out of the entire overlapping cylinders. Normal injections are performed in the certain overlapping cylinders immediately before the normal injections performed in the non-overlapping cylinders. Thus, heat generation of an injection drive circuit can be reduced. Meanwhile, an injection pressure of the normal injection performed by an injector in each cylinder can be stabilized.

8 Claims, 5 Drawing Sheets

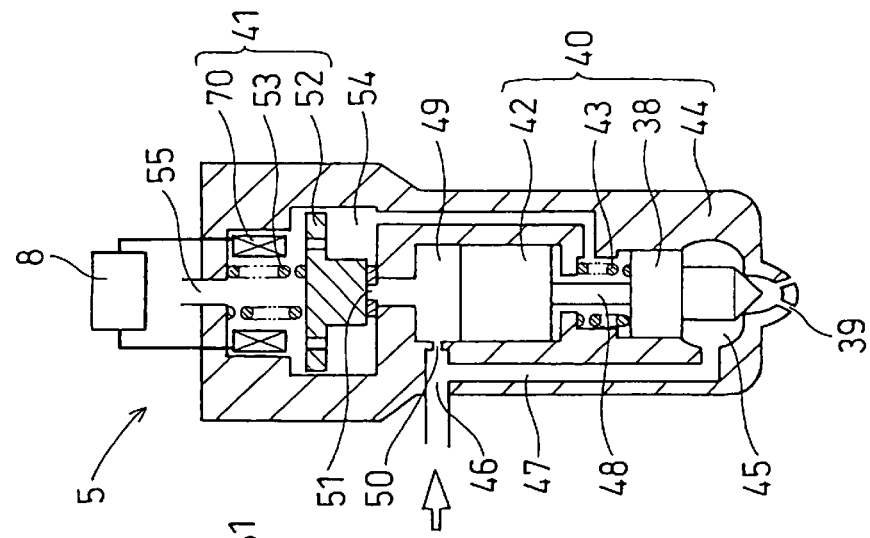
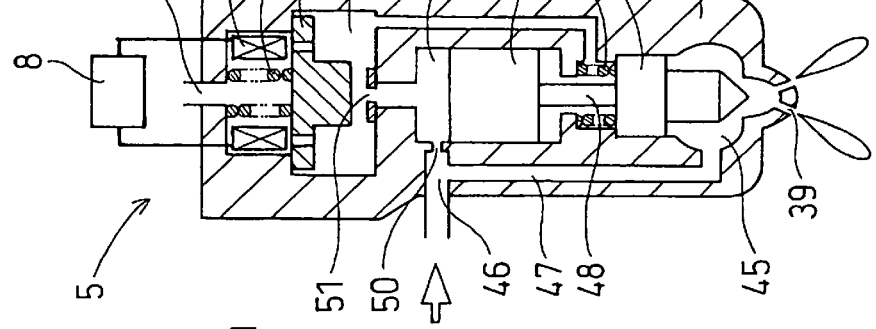
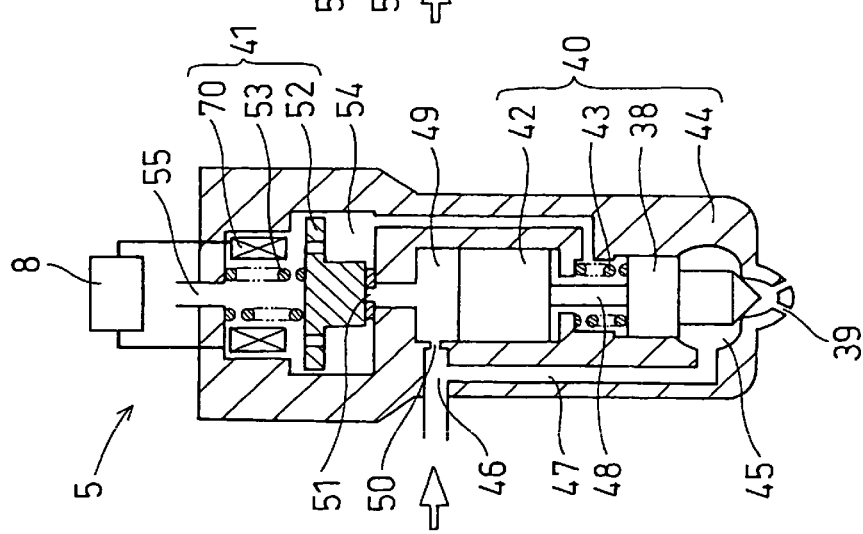

LOW HEAT GENERATION FUEL INJECTION SYSTEM

CROSS REFERENCE TO RELATED APPLICATION

This application is based on and incorporates herein by reference Japanese Patent Application No. 2003-415431 filed on Dec. 12, 2003.

BACKGROUND OF THE INVENTION

1. Field of the Invention

The present invention relates to a fuel injection system capable of supplying unburned gas such as hydrocarbon (HC) into exhaust gas of an engine.

2. Description of Related Art

There has been a known fuel injection system for supplying unburned gas into exhaust gas of an engine in order to regenerate a particulate filter disposed in an exhaust passage or in order to quickly heat a catalyst disposed in the exhaust passage. A technology of performing a post-injection after a normal injection is known as means for supplying the unburned gas into the exhaust gas of the engine. For instance, the normal injection is a single injection consisting of a main injection or is a multi-injection as a combination of a pilot injection and the main injection. The normal injection is performed to generate engine torque. For instance, the post-injection is performed at a crank angle of 20–50° (20–50° CA) after a top dead center.

In the post-injection, fuel is supplied during an expansion stroke of the engine. Therefore, combustion becomes unstable and a large amount of the unburned gas (HC) is generated. The unburned gas is ignited in the particulate filter or the catalyst disposed in the exhaust passage, and regenerates the particulate filter or quickly heats the catalyst.

A control device for controlling injectors includes injection controlling means and injector driving means. The injection controlling means is a part of a function of an electronic control unit (ECU). The injector driving means is a part of a function of an electric drive unit (EDU), or an injector drive circuit. The injection controlling means calculates an injection pattern, injection timing, and an injection quantity or an injection period corresponding to an operating state of the engine, and outputs command signals (injector driving signals) for each injection. The injector driving means supplies driving power to an actuator (an electromagnetic valve, for instance) of the injector responsive to the command signal, which is outputted from the ECU.

Since the injector driving means is a circuit for supplying a driving current to the injector for each injection, the injector driving means generates a large amount of heat. Therefore, suppression of the heat generation of the injector driving means is required. Specifically, in the case of the multi-injection for performing the multiple fuel injections during one compression stroke, the number of times of the injections is large, so a large amount of heat is generated.

Moreover, the number of times of the injections shows a positive correlation with engine rotation speed. Therefore, the amount of the heat generated by the injector drive circuit shows a positive correlation with the engine rotation speed. Accordingly, the amount of the heat generated by the injector drive circuit increases as the engine rotation speed increases. In some cases, an upper limit of the engine rotation speed is set by the heat generation limit of the injector drive circuit.

When the post-injection is performed in a situation where the suppression of the heat generation of the injector drive circuit is highly required, suppression of the heat generation due to the post-injection is required in addition to the suppression of the heat generation due to the normal injection. Therefore, it is required to suppress the heat generation of the injector drive circuit specifically in a period for performing the post-injection.

A technology for suspending the injection if the operating state of the engine is in a certain area where the engine rotation speed is high and a load on the engine is light is known as a technology for suppressing the heat generation of the injector driving means as disclosed in Unexamined Japanese Patent Application Publication No. H09-060541, for instance. A technology for suspending the injection if a common rail pressure is higher than a target value by a predetermined value or more when the engine reaches an accelerating state is known as a technology for suppressing the heat generation of the injector driving means as disclosed in Unexamined Japanese Patent Application Publication No. H08-232740, for instance.

However, the above technologies are performed under the conditions quite different from the condition for performing the post-injection. Therefore, the technologies cannot suppress the heat generation of the injector drive circuit in the period for performing the post-injection.

SUMMARY OF THE INVENTION

It is therefore an object of the present invention to provide a fuel injection system capable of suppressing heat generation of injector driving means in a period for performing a post-injection.

According to an aspect of the present invention, injection controlling means of a fuel injection system intermittently implements a post-injection suspending pattern for suspending output of a post-injection command signal in a period for performing post-injection operation, which is performed to supply unburned gas into exhaust gas of an engine, after outputting a normal injection command signal.

Thus, the post-injection is intermittently suspended in the period for performing the post-injection operation. As a result, the heat generation of injector driving means can be suppressed in the period for performing the post-injection operation.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 2A is a longitudinal cross-sectional view showing an injector of the fuel injection system according to the embodiment;

FIG. 2B is a longitudinal cross-sectional view showing the injector of the fuel injection system according to the embodiment;

FIG. 2C is a longitudinal cross-sectional view showing the injector of the fuel injection system according to the embodiment;

DETAILED DESCRIPTION OF THE REFERRED EMBODIMENT

Figure 1A:
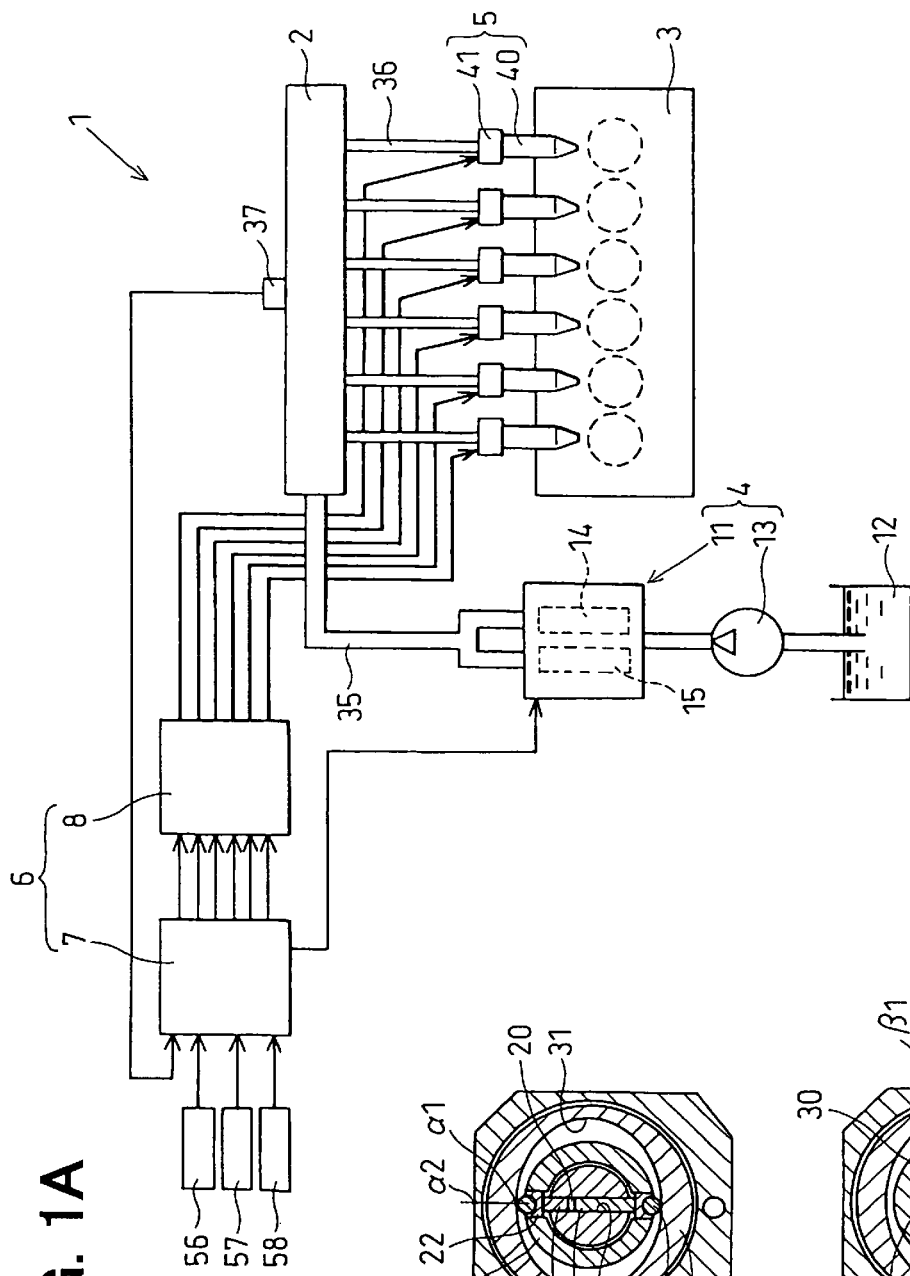
FIG. 1A is a schematic diagram showing a fuel injection system according to an embodiment of the present invention.

Referring to FIG. 1A, a fuel injection system 1 according to an embodiment of the present invention is illustrated. As shown in FIG. 1A, the fuel injection system 1 of the present embodiment is a pressure accumulation type fuel injection system including a common rail 2 as a pressure accumulation vessel for accumulating fuel at a high pressure. The fuel injection system 1 injects the fuel from the common rail 2 into respective cylinders of an engine 3.

Figure 4C:
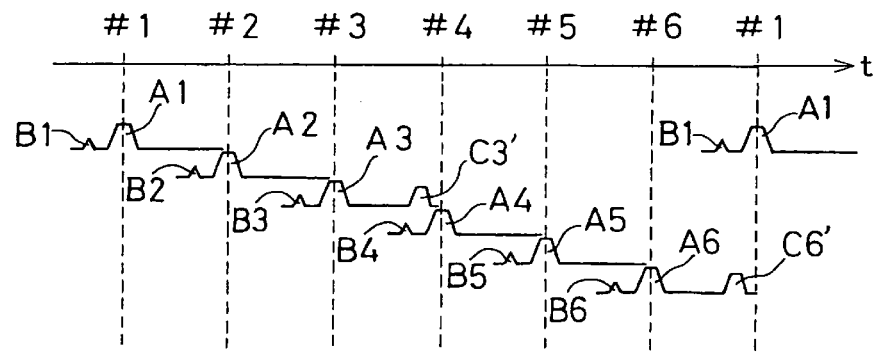
FIG. 4C is a time chart showing a pattern of injection rates provided by the fuel injection system of the embodiment.
Figure 5:
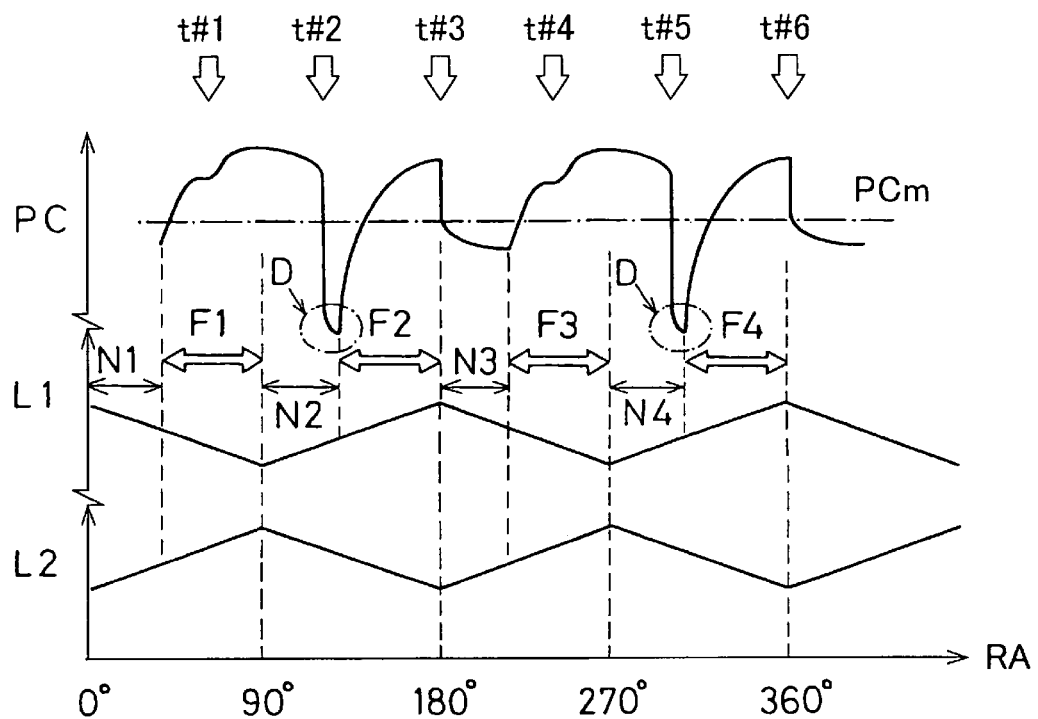
FIG. 5 is a time chart showing a behavior of a common rail pressure and a fuel pressure-feeding operation of a fuel supply pump of the fuel injection system according to the embodiment.

The fuel injection system 1 includes a fuel supply pump 4, the common rail 2, injectors 5, and a control device 6. The fuel supply pump 4 pressure-feeds the fuel. The common rail 2 accumulates the fuel, which is pressure-fed from the fuel supply pump 4, at the high pressure. The injectors 5 are mounted to the respective cylinders of the engine 3 and inject the high-pressure fuel, which is accumulated in the common rail 2, into the respective cylinders of the engine 3. The control device 6 drives and controls the fuel injection system 1. The fuel injections-are performed in the cylinders #1, #2, #3, #4, #5, #6 of the engine 3 in that order as shown in FIGS. 4C and 5.

As shown in FIG. 1A, the fuel supply pump 4 includes a high-pressure supply section 11, a low-pressure pump 13, and a pump drive shaft. The high-pressure supply section 11 pressurizes the fuel and pressure-feeds the fuel into the common rail 2. The low-pressure pump 13 draws the fuel from a fuel tank 12 and feeds the fuel to the high-pressure supply section 11. The pump drive shaft drives the high-pressure supply section 11 and the low-pressure pump 13 with the use of engine torque transmitted from a crankshaft of the engine 3. Since the pump drive shaft rotates at a rotational speed equal to ½ of that of the crankshaft, the pump drive shaft makes one revolution during two cycles of the engine 3.

The high-pressure supply section 11 includes first and second high-pressure pump elements 14, 15, a cam mechanism 16, and first and second suction control valves. The first and second high-pressure pump elements 14, 15 pressurize the fuel and pressure-feed the fuel into the common rail 2. The cam mechanism 16 drives the first and second high-pressure pump elements 14, 15. The first and second suction control valves regulate the quantities of the fuel supplied from the low-pressure pump 13 into the first and second high-pressure pump elements 14, 15. The control device 6 regulates the quantities of the fuel, which is supplied into the first and second high-pressure pump elements 14, 15, to conform a fuel pressure of the common rail 2 (a common rail pressure PC) to a fuel injection pressure corresponding to an operating state of the engine 3.

Figure 1B:
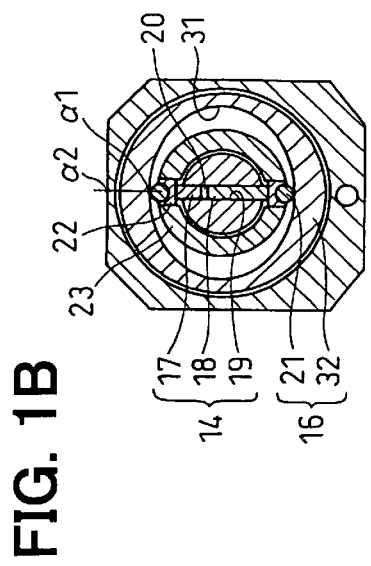
FIG. 1B is a cross-sectional view showing a fuel supply pump of the fuel injection system according to the embodiment.

As shown in FIG. 1B, the first high-pressure pump element 14 includes a first short plunger 17, a first long plunger 18, and a first cylinder 19. The first short plunger 17 and the first long plunder 18 pressurize the fuel. The first cylinder 19 slidably accommodates the first short plunger 17 and the first long plunger 18. An end surface of the first short plunger 17 faces an end surface of the first long plunger 18. The end surfaces of the first short plunger 17 and the first long plunger 18 facing each other and an inner peripheral surface of the first cylinder 19 define a first pressurizing chamber 20 for receiving and pressurizing the fuel. The first pressurizing chamber 20 repeats expansion and contraction to repeat the drawing operation and the pressure-feeding operation of the fuel.

The first short plunger 17 is made so that the size of the first short plunger 17 along a longitudinal axial direction is shorter than that of the first long plunger 18, and the first pressurizing chamber 20 is formed at a position deviating from the center of the cylinder 19. Thus, formation of a fuel passage communicating with a suction port of the first pressurizing chamber 20 is facilitated. First shoes 22 are formed on the other end surfaces of the first short plunger 17 and the first long plunger 18 for accommodating first cam rollers 21 so that the first cam rollers 21 can rotate in a sliding manner. First shoe guides 23 hold the first shoes 22 so that the first shoes 22 can reciprocate in a sliding manner.

Figure 1C:
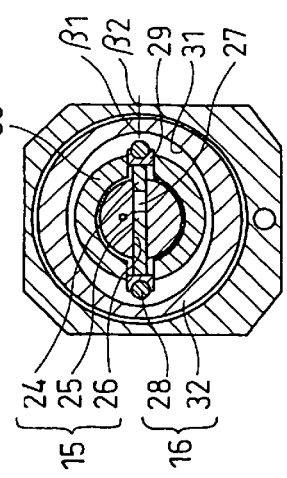
FIG. 1C is a cross-sectional view showing the fuel supply pump of the fuel injection system according to the embodiment.

Like the first high-pressure pump element 14, the second high-pressure pump element 15 includes a second short plunger 24, a second long plunger 25, and a second cylinder 26 and forms a second pressurizing chamber 27 as shown in FIG. 1C. Like the first shoes 22, second shoes 29 are formed for accommodating second cam rollers 28 so that the second cam rollers 28 can rotate in a sliding manner. Second shoe guides 30 hold the second shoes 29 so that the second shoes 29 can reciprocate in a sliding manner. As shown in FIGS. 1B and 1C, the second high-pressure pump element 15 and the first high-pressure pump element 14 provide an angle of 90° therebetween, and both of the pump elements 14, 15 are separately disposed along an axial direction, or along a direction of a rotational axis of the pump drive shaft.

As shown in FIGS. 1B and 1C, the cam mechanism 16 is made up of an inner cam 32 and the first and second cam rollers 21, 28. The inner cam 32 has an elliptic-cylindrical cam surface 31 formed coaxially with the pump drive shaft. The first cam rollers 21 and the second cam rollers 28 are driven to rotate by the cam surface 31. When the fuel is pressure-fed, the first cam rollers 21 or the second cam rollers 28 are pressed by the cam surface 31, and the first cam rollers 21 or the second cam rollers 28 push the first short plunger 17 and the first long plunger 18 or the second short plunger 24 and the second long plunger 25 inward. When the fuel is drawn, the first cam rollers 21 or the second cam rollers 28 are pushed outward by the first short plunger 17 and the first long plunger 18 or the second short plunger 24 and the second long plunger 25, and the first cam rollers 21 or the second cam rollers 28 are pressed against the cam surface 31.

Next, operation of the fuel supply pump 4 will be explained based on FIGS. 1B, 1C and 5. FIG. 1B shows a state in which the first short plunger 17 and the first long plunger 18 are positioned closest to each other, or a state in which the volume of the first pressurizing chamber 20 is minimized. FIG. 1B shows a state in which the pressure-feeding operation ends and the fuel drawing operation for drawing the fuel into the first pressurizing chamber 20 starts. FIG. 1C shows a state in which the second short plunger 24 and the second long plunger 25 are positioned farthest from each other, or a state in which the volume of the second pressurizing chamber 27 is maximized. FIG. 1C shows a state in which the drawing operation of a predetermined quantity of the fuel ends. FIGS. 1B and 1C show a state in which a rotational angle RA of the inner cam 32 is 0°. The inner cam 32 rotates counterclockwise in FIGS. 1B and 1C.

A sign L1 in FIG. 5 denotes a distance between a movement point α1 and a reference point α2 shown in FIG. 1B. As shown in FIG. 1B, the movement point α1 signifies a point moving on the cam surface 31 in accordance with the rotation of the inner cam 32 while facing the first cam roller 21 along an axial direction of the first cylinder 19. The reference point α2 signifies a point fixed at a predetermined position of the fuel supply pump 4 as shown in FIG. 1B. A sign L2 in FIG. 5 denotes a distance between a similar movement point β1 and a similar reference point β2 shown in FIG. 1C. FIG. 1B shows the movement point α1 and the reference point α2 in the state where the rotational angle RA is 0°. FIG. 1C shows the movement point β1 and the reference point β2 in the state where the rotational angle RA is 0°. The distance L1 between the movement point α1 and the reference point α2 shown in FIG. 1B is the maximum value. The distance L2 between the movement point β1 and the reference point β2 shown in FIG. 1C is the minimum value.

While the rotational angle RA changes from 0° to 90°, the distance L1 decreases from the maximum value to the minimum value in the first high-pressure pump element 14 as shown in FIG. 5. Meantime, the drawing operation of the fuel into the first pressurizing chamber 20 ends, and the first cam rollers 21 separate from the cam surface 31. While the rotational angle RA changes from 0° to 90°, the distance L2 increases from the minimum value to the maximum value in the second high-pressure pump element 15. Meantime, the second cam rollers 28 come into touch with the cam surface 31 to start pushing the second short plunger 24 and the second long plunger 25. Thus, the pressure-feeding operation of the fuel from the second pressurizing chamber 27 starts. When the rotational angle RA becomes 90°, the pressure-feeding operation of the fuel from the second pressurizing chamber 27 ends, and the drawing operation of the fuel into the second pressurizing chamber 27 starts. Thus, a non-pressure-feeding period N1 is followed by a pressure-feeding period F1, during which the first pressure-feeding operation is performed by the second high-pressure pump element 15 as shown in FIG. 5.

While the rotational angle RA changes from 90° to 180°, the distance L1 increases from the minimum value to the maximum value in the first high-pressure pump element 14. Meantime, the first cam rollers 21 come into touch with the cam surface 31 and start pushing the first short plunger 17 and the first long plunger 18. Thus, the pressure-feeding operation of the fuel from the first pressurizing chamber 20 starts. When the rotational angle RA becomes 180°, the pressure-feeding operation of the fuel from the first pressurizing chamber 20 ends, and the fuel drawing operation into the first pressurizing chamber 20 starts. While the rotational angle RA changes from 90° to 180°, the distance L2 decreases from the maximum value to the minimum value in the second high-pressure pump element 15. Thus, the fuel drawing operation into the second pressurizing chamber 27 ends, and the second cam rollers 28 separate from the cam surface 31. Thus, a non-pressure-feeding period N2 is followed by a pressure-feeding period F2, during which the second pressure-feeding operation is performed by the first high-pressure pump element 14.

While the rotational angle RA changes from 180° to 270°, the same operations as the operations performed while the rotational angle RA changes from 0° to 90° are repeated in the first and second high-pressure pump elements 14, 15. Therefore, a non-pressure-feeding period N3 is followed by a pressure-feeding period F3, during which the third pressure-feeding operation is performed by the second high-pressure pump element 15. While the rotational angle RA changes from 270° to 360°, the same operations as the operations performed while the rotational angle RA changes from 90° to 180° are repeated in the first and second high-pressure pump elements 14, 15. Therefore, a non-pressure-feeding period N4 is followed by a pressure-feeding period F4, during which the fourth pressure-feeding operation is performed by the first high-pressure pump element 14.

Thus, as shown in FIG. 5, during one revolution of the pump drive shaft, that is, during the two cycles of the engine 3, the pressure-feeding operations are performed four times in total, or the fuel is pressure-fed from the first and second high-pressure pump elements 14, 15 of the fuel supply pump 4 two times respectively and alternately.

The common rail 2 provides a part of a fuel pipe leading from the fuel supply pump 4 to the respective injectors 5, and accumulates the fuel at a high pressure corresponding to the injection pressure. As shown in FIG. 1A, the common rail 2 is connected with a fuel passage 35, through which the fuel is pressure-fed from the fuel supply pump 4, and with multiple fuel passages 36, through which the fuel is supplied into the injectors 5 mounted on the respective cylinders. A common rail pressure sensor 37 for sensing the fuel pressure in the common rail 2 (the common rail pressure PC) is mounted to the common rail 2. The common rail pressure 37 outputs a-sensing signal of the common rail pressure to the control device 6.

The injector 5 is an electromagnetic fuel injection valve actuated by a magnetic force, which is induced by a driving power supplied from an injector drive circuit 8. As shown in FIGS. 2A to 2C, the injector 5 includes a valve main body 40 and an electromagnetic valve 41. The valve main body 40 opens or closes an injection hole 39 with a needle 38 to start or to stop the fuel injection. The electromagnetic valve 41 is an actuator for actuating the valve main body 40. A direction in which the needle 38 opens the injection hole 39 is referred to as a hole-opening direction, and a direction in which the needle 38 closes the injection hole 39 is referred to as a hole-closing direction, hereafter. Since the engine 3 of the embodiment has the six cylinders as shown in FIG. 1A, the fuel injection system 1 includes the six injectors 5.

The valve main body 40 includes the needle 38 for opening and closing the injection hole 39, a piston 42, which receives the back pressure of the fuel and biases the needle 38 in the hole-closing direction, a spring 43 for biasing the needle 38 in the hole-closing direction, and a body portion 44 for accommodating the needle 38, the piston 42 and the spring 43. The injection hole 39 is provided at a tip end of the body portion 44.

The needle 38 is accommodated in the tip end portion of the body portion 44, and is biased in the hole-opening direction by a fluid pressure of the fuel in a fuel reservoir 45 formed in the tip end portion of the body portion 44. The fuel reservoir 45 communicates with the common rail 2 through fuel passages 46, 47, which are formed in the body portion 44, and the fuel passage 36, which connects the common rail 2 with the injector 5. The fuel reservoir 45 communicates with the cylinder through the injection hole 39 when the injection hole 39 is open.

The piston 42 is coaxially connected with the needle 38 through a pressure pin 48, and moves with the needle 38 within the body portion 44. The piston 42 is accommodated in a rear end portion of the body portion 44. The piston 42 is biased in the hole-closing direction by a back pressure of the fuel in a back pressure control chamber 49, which is formed in the rear end portion of the body portion 44. The back pressure control chamber 49 communicates with the fuel passage 46 through an entry-side orifice 50, and with the inside of the electromagnetic valve 41 through an exit-side orifice 51.

The diameter of the entry-side orifice 50 is set to be smaller than that of the exit-side orifice 51. Thus, the back pressure can be controlled by opening and closing the exit-side orifice 51. More specifically, when the exit-side orifice 51 is open, the fuel discharged from the back pressure control chamber 49 becomes larger in quantity than the fuel supplied into the back pressure control chamber 49. Accordingly, the back pressure decreases. When the exit-side orifice 51 is closed, the discharge of the fuel from the back pressure control chamber 49 is stopped but the supply of the fuel from the entry-side orifice 50 continues, so the back pressure increases.

The spring 43 is interposed between the needle 38 and the piston 42. The rear end of the spring 43 is attached to the body portion 44, and the tip end of the spring 43 is attached to the rear end of the needle 38. The spring 43 biases the needle 38 in the hole-closing direction by its resilient force.

The electromagnetic valve 41 includes a solenoid 70, a valve member 52, a spring 53 and the like. The solenoid 70 generates a magnetic force when the solenoid 70 is energized through the injector drive circuit 8. The valve member 52 opens the exit-side orifice 51 of the back pressure control chamber 49 when the valve member 52 receives the magnetic force. The spring 53 biases the valve member 52 in the direction for closing the exit-side orifice 51. A fuel passage 54 is formed in the electromagnetic valve 41 and communicates with the fuel tank 12 through a discharge port 55. The valve member 52 opens and closes the exit-side orifice 51 to control the back pressure in the back pressure control chamber 49.

Next, operation of the injector 5 will be explained based on FIG. 1A and FIGS. 2A to 2C.

As shown in FIG. 1A, the high-pressure fuel in the common rail 2 is supplied into the valve main body 40 through the fuel passage 36. As shown in FIG. 2A, the fuel supplied into the valve main body 40 is supplied into the fuel reservoir 45 through the fuel passages 46, 47, and is also supplied into the back pressure control chamber 49 through the fuel passage 46 and the entry-side orifice 50. When the exit-side orifice 51 is closed by the valve member 52, a biasing force in the hole-closing direction, which is the summation of the back pressure acting on the piston 42 and the resilient force of the spring 43, is greater than a biasing force in the hole-opening direction, which is the fluid pressure of the fuel reservoir 45. Therefore, the injection hole 39 is kept closed by the needle 38, and the fuel is not injected.

If energization of the solenoid 70 is started and the magnetic force generated by the solenoid 70 exceeds the resilient force of the spring 53, the valve member 52 opens the exit-side orifice 51 as shown in FIG. 2B. Thus, in the back pressure control chamber 49, the fuel discharged through the exit-side orifice 51 becomes greater in quantity than the fuel supplied through the entry-side orifice 50, so the back pressure decreases. When the biasing force in the hole-closing direction, which is the summation of the back pressure acting on the piston 42 and the resilient force of the spring 43, becomes less than the biasing force in the hole-opening direction, which is the fluid pressure of the fuel reservoir 45, the needle 38 ascends to start the fuel injection from the injection hole 39.

Thereafter, if the solenoid 70 is deenergized, the valve member 52 is biased by the resilient force of the spring 53, and the exit-side orifice 51 is closed as shown in FIG. 2C. Thus, the fuel discharge from the back pressure control chamber 49 is stopped but the fuel supply through the entry-side orifice 50 continues, so the back pressure increases. If the biasing force in the hole-closing direction, which is the summation of the back pressure acting on the piston 42 and the resilient force of the spring 43 becomes greater than the biasing force in the hole-opening direction, which is the fluid pressure of the fuel reservoir 45, the needle 38 descends to stop the fuel injection from the injection hole 39.

As shown in FIG. 1A, the control device 6 includes an electronic control unit (ECU) 7, the injector drive circuit 8 and the like. The ECU 7 outputs various command signals for controlling the fuel supply pump 4, the injectors 5, and the like. The injector drive circuit 8 supplies the driving power to the electromagnetic valves 41 of the injectors 5 responsive to the command signals outputted from the ECU 7. The ECU 7 functions as injection controlling means for outputting a normal injection command signal for performing a normal injection, which is performed to obtain engine torque, and a post-injection command signal for performing a post-injection after the normal injection for supplying unburned gas into exhaust gas. The injector drive circuit 8 functions as injector driving means for performing the energization of the electromagnetic valves 41 responsive to the command signals outputted from the ECU 7.

The ECU 7 has a computer, which includes a central processing unit (CPU), a memory device, an input device, an output device, and the like. The ECU 7 receives sensor signals from various sensors and synthesizes and outputs various command signals in accordance with the sensor signals. Thus, the pressure-feeding operation of the fuel supply pump 4, the fuel injection from the injectors 5 and the like are controlled.

For instance, in the control of the normal injection, the ECU 7 calculates injection timing and injection periods in accordance with the sensor signals outputted from the sensors such as an engine rotation speed sensor 56 and an accelerator position sensor 57, which sense the operating states of the engine 3. The ECU 7 determines a cylinder (a specified cylinder), in which the fuel injection is to be performed, based on a sensor signal outputted from a cylinder determination sensor 58. Then, the ECU 7 synthesizes the normal injection command signal for energizing the electromagnetic valve 41 of the injector 5 mounted on the specified cylinder.

Figure 4A:
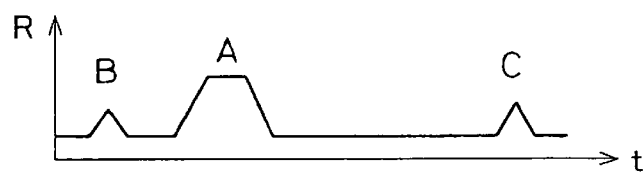
FIG. 4A is a time chart showing a pattern of an to the embodiment.

In the present embodiment, as shown in FIG. 4A, the normal injection is performed in two divided stages in order to suppress a sudden rise of an injection rate R at the start of the injection and to reduce combustion noise and vibrations. More specifically, the normal injection is divided into a pilot injection B for injecting a small quantity of the fuel at the first stage, and a main injection A for injecting a most part of the fuel at the second stage. Therefore, the injection timing and the injection periods are respectively calculated for the main injection A and the pilot injection B, and also the normal injection command signals are respectively synthesized for the main injection A and the pilot injection B.

In the control of the post-injection C shown in FIG. 4A, the ECU 7 determines whether or not a post-injection operation for supplying the unburned gas into the exhaust gas should be performed, in accordance with sensor signals outputted from various sensors mounted to an exhaust-gas purifying system. The ECU 7 determines whether or not the specified cylinder is a cylinder in which the post-injection C can be performed, in accordance with the sensor signal outputted from the cylinder determination sensor 58. If it is determined that the post-injection operation should be performed and the specified cylinder is the cylinder in which the post-injection C can be performed, the ECU 7 calculates the injection timing and the injection period in accordance with the above sensor signals, and synthesizes the post-injection command signal for energizing the electromagnetic valve 41 of the injector 5 mounted on the specified cylinder (hereinafter, the injection command signals such as the normal injection command signal and the post-injection command signal are referred to as injector driving signals).

The exhaust gas purifying system eliminates particulate matters contained in the exhaust gas and purifies nitrogen oxides, carbon monoxide, and the like. The exhaust gas purifying system includes a filter (a particulate filter) for eliminating the particulate matters, a catalyst for purifying the gases such as the nitrogen oxides or the carbon monoxide, and the like. The exhaust gas discharged from the engine 3 passes through the particulate filter first. Thus, the particulate matters are eliminated. Subsequently, the exhaust gas passes through the catalyst. Thus, the gases such as the nitrogen oxides or the carbon monoxide are purified. The various sensors include a pressure sensor mounted across an upstream side and a downstream side of the particulate filter for sensing a pressure difference of the exhaust gas across the particulate filter, a temperature sensor mounted between the particulate filter and the catalyst for sensing the temperature of the exhaust gas, and the like.

Figure 4B:
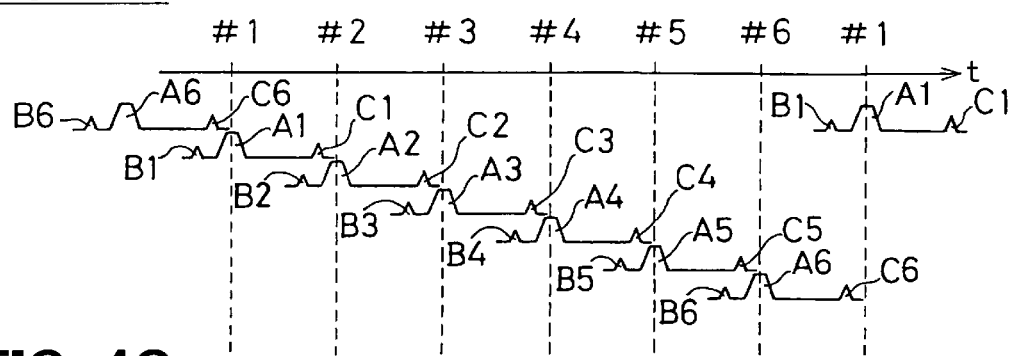
FIG. 4B is a time chart showing a pattern of injection rates provided by a fuel injection system of a prior art.

The fuel injected in the post-injection C is not exploded in the cylinder but is supplied into the exhaust gas purifying system as the unburned gas. The post-injection C in a certain cylinder is performed immediately after the pilot injection B in a next cylinder and immediately before the main injection A in the next cylinder as shown in FIGS. 4B and 4C. The next cylinder is a cylinder in which the normal injection is performed next to the normal injection in the certain cylinder. In FIGS. 4B and 4C, the main injections A in the cylinders #1, #2, #3, #4, #5, #6 are respectively denoted by signs A1, A2, A3, A4, A5, A6, and the pilot injections B in the cylinders #1, #2, #3, #4, #5, #6 are respectively denoted by signs B1, B2, B3, B4, B5, B6. The post-injections C performed in cylinders #1, #2, #3, #4, #5, #6 of a prior art are respectively denoted by signs C1, C2, C3, C4, C5, C6 in FIG. 4B. The post-injections C performed in the cylinders #3, #6 of the present embodiment are respectively denoted by signs C3', C6' in FIG. 4C.

The ECU 7 outputs the injector driving signal to the injector drive circuit 8 based on the calculated injection timing and injection period. More specifically, the ECU 7 starts outputting the injector driving signal when the injection timing is reached, and stops outputting the injector driving signal when the injection period lapses.

Figure 3:
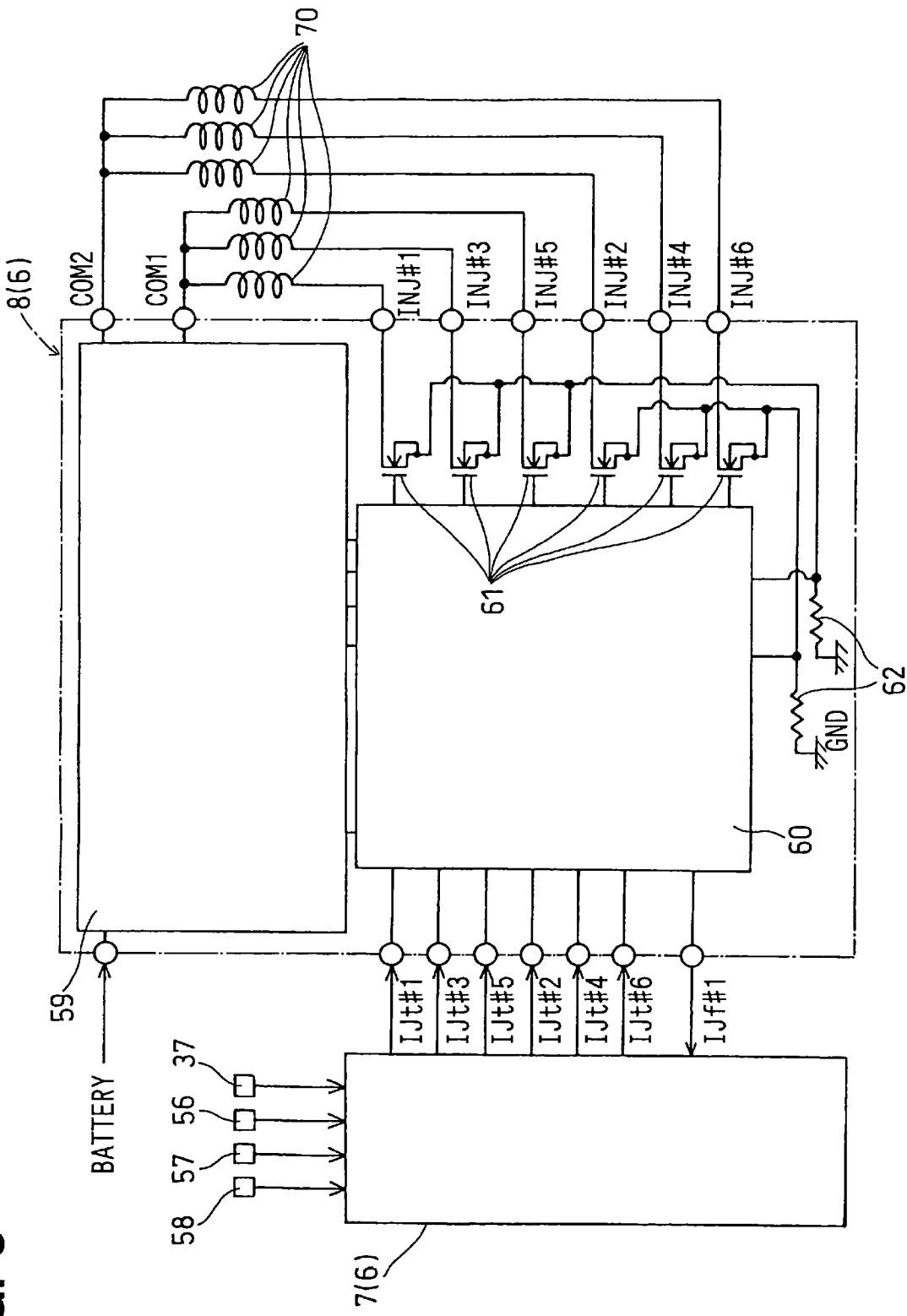
FIG. 3 is a circuit diagram showing an electronic control unit and an injector drive circuit of the fuel injection system according to the embodiment.

The injector driving signals are synthesized for the respective cylinders and are outputted to the injector drive circuit 8 as shown by signs IJt#1, IJt#2, IJt#3, IJt#4, IJt#5, IJt#6 in FIG. 3. The injector driving signals IJt#1, IJt#2, IJt#3, IJt#4, IJt#5, IJt#6 are signals for the cylinders #1, #2, #3, #4, #5, #6, respectively. The signals IJt#1, IJt#2, IJt#3, IJt#4, IJt#5, IJt#6 are synthesized so that only the driving signal for the specified cylinder becomes an H (high) level to energize the electromagnetic valve 41 of the injector 5 mounted on the specified cylinder. A sign IJf1 in FIG. 3 denotes an abnormality diagnosis signal, which expresses whether or not the energization of the electromagnetic valve 41 is performed normally.

The injector drive circuit 8 includes a high voltage generation circuit 59, driving transistors 61, a control circuit 60, current detection resistors 62, and the like as shown in FIG. 3. The high voltage generation circuit 59 receives the power from a battery to generate the driving current for energizing the electromagnetic valve 41 of the injector 5. The driving transistor 61 supplies the driving current to the electromagnetic valve 41 of the injector 5 mounted on the specified cylinder from the high voltage generation circuit 59. The control circuit 60 actuates the driving transistors 61 and controls the driving currents supplied to the electromagnetic valves 41. The current detection resistor 62 monitors whether or not any abnormality is involved in the supply of the driving current.

The high voltage generation circuit 59 includes two capacitors, two charging transistors, two large current transistors, two constant current transistors, and the like. The capacitor receives the power from the battery and is charged to a high voltage. The charging transistor supplies a charging current from the battery to the capacitor. The large current transistor discharges the high voltage stored in the capacitor to supply the large current to the solenoids 70. The constant current transistor supplies the constant current, which is smaller than the large current, directly from the battery to the solenoids 70. The transistors are actuated by control signals outputted from the control circuit 60.

One out of the two capacitors, one out of the two charging transistors, one out of the two large current transistors, and one out of the two constant current transistors are wired with each other and are used for the cylinders #1, #3, #5. The other capacitor, the other charging transistor, the other large current transistor, and the other constant current transistor are wired with each other and are used for the cylinders #2, #4, #6. An output terminal COM1 for the cylinders #1, #3, #5 is connected to the solenoids 70 of the electromagnetic valves 41 of the injectors 5 mounted on the cylinders #1, #3, #5. An output terminal COM2 for the cylinders #2, #4, #6 is connected to the solenoids 70 of the electromagnetic valves 41 of the injectors 5 mounted on the cylinders #2, #4, #6. The transistors are energized alternately for the injection in each cylinder so that the transistors corresponding to one cylinder are not energized continuously.

The control circuit 60 receives the injector driving signals IJt#1, IJt#2, IJt#3, IJt#4, IJt#5, IJt#6 from the ECU 7 and outputs these signals to the respective driving transistors 61. Meanwhile, the control circuit 60 synthesizes various control signals and outputs the control signals to the high voltage generation circuit 59. The control circuit 60 detects the driving currents with the use of the current detection resistors 62 to monitor whether or not any abnormality is involved in the driving currents, and the control circuit 60 outputs the result of the monitoring of the driving currents to the ECU 7 as the abnormality diagnosis signal (IJf1).

The number of the driving transistors 61 is the same as the number of the cylinders. The respective driving transistors 61 are connected with the solenoids 70 of the electromagnetic valves 41 of the injectors 5 mounted on the cylinders through terminals INJ#1, INJ#2, INJ#3, INJ#4, INJ#5, INJ#6. The terminals INJ#1, INJ#2, INJ#3, INJ#4, INJ#5, INJ#6 are connected with the solenoids 70 of the injectors 5 mounted on the cylinders #1, #2, #3, #4, #5, #6 respectively. The driving transistor 61 connected to the solenoid 70 of the specified cylinder is actuated by the injector driving signal outputted from the control circuit 60. Thus, the solenoid 70 of the specified cylinder is energized with the driving current.

The number of the current detection resistors 62 is the same as the number of the output terminals COM1, COM2 leading from the high voltage generation circuit 59. One of the current detection resistors 62 is used for detecting the driving currents supplied from the output terminal COM1 to the electromagnetic valves 41 of the injectors 5 mounted on the cylinders #1, #3, #5. The other current detection resistor 62 is used for detecting the driving currents supplied from the output terminal COM2 to the electromagnetic valves 41 of the injectors 5 mounted on the cylinders #2, #4, #6.

Next, operation of the injector drive circuit 8 will be explained. First, if the injector driving signal is inputted from the ECU 7 to the control circuit 60, the control circuit 60 outputs the injector driving signal to the driving transistor 61. Thus, the driving transistor 61 for the specified cylinder is actuated. Simultaneously, the control circuit 60 outputs the control signal to the large current transistor to actuate the large current transistor corresponding to the specified cylinder. Thus, the large current is supplied from the capacitor to the solenoid 70 corresponding to the specified cylinder, and the needle 38 immediately ascends to start the injection. Thus, when the injection is started, the large current corresponding to the high voltage stored in the capacitor is supplied to the solenoid 70 in order to improve the response of the start of the injection.

Then, the control circuit 60 switches from a state in which the control circuit 60 outputs the control signal to the large current transistor to a state in which the control circuit 60 outputs the control signal to the constant current transistor. Thus, the control circuit 60 actuates the constant current transistor corresponding to the specified cylinder. Thus, the constant current is supplied from the battery to the solenoid 70 corresponding to the specified cylinder. Accordingly, the needle 38 is kept raised and the injection is continued. Then, if the input of the injector driving signal from the ECU 7 ends, the control signals outputted to the driving transistor 61 and the constant current transistor are stopped, and the energization of the solenoid 70 is stopped.

In the present embodiment, as shown in FIG. 5, the cylinders #1, #3, #4, #6 are overlapping cylinders, and the cylinders #2, #5 are non-overlapping cylinders. More specifically, an injection period t#1 of the normal injection of the cylinder #1 exists substantially at the middle of the pressure-feeding period F1, and is overlapped with the pressure-feeding period F1. An injection period t#2 of the normal injection of the cylinder #2 exists in the latter half of the non-pressure-feeding period N2, and is not overlapped with any pressure-feeding period. An injection period t#3 of the normal injection of the cylinder #3 exists substantially at the end of the pressure-feeding period F2, and is overlapped with the pressure-feeding period F2. The injection period t#4 of the normal injection of the cylinder #4 exists substantially at the middle of the pressure-feeding period F3, and is overlapped with the pressure-feeding period F3. The injection period t#5 of the normal injection of the cylinder #5 exists in the latter half of the non-pressure-feeding period N4, and is not overlapped with any pressure-feeding period. The injection period t#6 of the normal injection of the cylinder #6 exists substantially at the end of the pressure-feeding period F4, and is overlapped with the pressure-feeding period F4.

On account of the existence of such overlapping cylinders and non-overlapping cylinders, the common rail pressure PC exhibits a certain behavior in the two cycles of the engine 3 as explained below. First, in the pressure-feeding period F1, the common rail pressure PC temporarily remains constant owing to the normal injection of the cylinder #1 performed substantially at the middle of the period F1, and then, the common rail pressure PC keeps increasing to a value higher than a central value PCm of the common rail pressure PC as shown in FIG. 5. Then, the common rail pressure PC remains higher than the central value PCm in the former half of the non-pressure-feeding period N2, but the common rail pressure PC abruptly decreases to a value lower than the central value PCm owing to the normal injection of the cylinder #2 performed in the latter half of the non-pressure-feeding period N2. In the pressure-feeding period F2, the common rail pressure PC consistently keeps increasing to a value higher than the central value PCm. Then, the common rail pressure PC abruptly decreases to a value slightly lower than the central value PCm substantially at the end of the pressure-feeding period F2 owing to the normal injection of the cylinder #3. In the non-pressure-feeding period N3, no normal injection is performed, and a state in which the common rail pressure PC is somewhat lower than the central value PCm is sustained. In the pressure-feeding period F3, a behavior similar to the behavior in the pressure-feeding period F1 is exhibited owing to the normal injection of the cylinder #4. In the non-pressure-feeding period N4, a behavior similar to the behavior in the non-pressure-feeding period N2 is exhibited owing to the normal injection of the cylinder #5. In the pressure-feeding period F4, a behavior similar to the behavior in the pressure-feeding period F2 is exhibited owing to the normal injection of the cylinder #6.

In the post-injection operation in the present embodiment, the post-injections C1, C2, C4, C5 of the cylinders #1, #2, #4, #5, which are performed in the prior art as shown in FIG. 4B, are suspended as shown in FIG. 4C. The cylinders #2, #5 are the non-overlapping cylinders, and the cylinders #1, #4 are the overlapping cylinders, in which the normal injections are performed immediately before the normal injections of the non-overlapping cylinders #2, #5 respectively. In the post-injection operation in the present embodiment, only the post-injections C3', C6' of the cylinders #3, #6 are performed as shown in FIG. 4C. That is, in a period for performing the post-injection operation in each one of the cylinders #1, #2, #4, #5, the ECU 7 implements a post-injection suspending pattern, in which no post-injection command signal is outputted after the normal injection command signal is outputted. In a period for performing the post-injection operation in each one of the cylinders #3, #6, the ECU 7 implements a post-injection performing pattern, in which the post-injection command signal is outputted after the normal injection command signal is outputted.

The unburned gas provided by the post-injection C is mainly led into the particulate filter, and is burned together with the particulate matters collected in the particulate filter. That is, a main purpose of the post-injection C in the present embodiment is to regenerate the particulate filter. Therefore, as shown in FIGS. 4B and 4C, the quantity of fuel supplied in each one of the post-injections C3', C6' is about three times as large as the quantity of the fuel supplied in each one of the post-injections C3, C6 in the prior art. Thus, the quantity of fuel supplied in each one of the post-injections C3', C6' is increased to compensate for the decrease in the fuel accompanying the suspension of the post-injections C1, C2, C4, C5.

The fuel injection system 1 of the present embodiment implements the post-injection suspending pattern in the four cylinders #1, #2, #4, #5 in the period for performing the post-injection operation.

Figure 6:
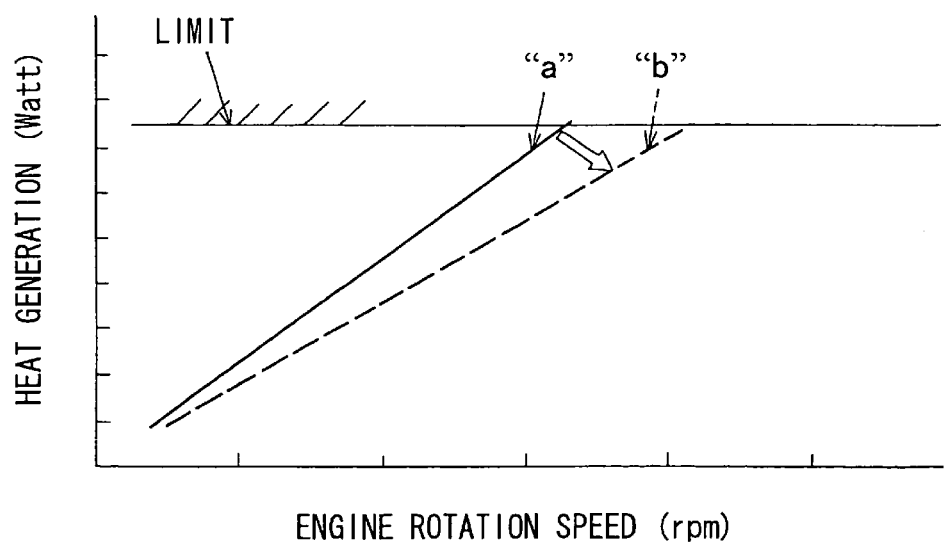
FIG. 6 is a graph showing a correlation between engine rotation speed and a heat generation amount of the injector drive circuit of the fuel injection system according to the embodiment.

Thus, in the period for performing the post-injection operation, the post-injection C is intermittently suspended. Therefore, the heat generation of the injector drive circuit 8 can be suppressed in the period for performing the post-injection operation, in which the amount of the heat generated by the injector drive circuit 8 can increase. More specifically, the number of times of the injections can be decreased from 18 to 14 for each two cycles of the engine 3, so that the thermal burden of the injector drive circuit 8 can be relieved as shown in FIG. 6. A solid line "a" in FIG. 6 indicates the amount of the heat generated by the injector drive circuit 8 in the case where the number of times of the injections is 18, and a broken line "b" indicates the amount of the heat generated in the case where the number of times of the injections is 14. An upper limit of engine rotation speed (engine rpm), below which the post-injection is possible, is set by a heat generation limit shown by a solid line LIMIT in FIG. 6. Therefore, in the present embodiment, the upper limit of the engine rotation speed can be raised.

As shown by areas D in FIG. 5, the common rail pressure PC greatly decreases after the normal injections are performed in the non-overlapping cylinders #2, #5. The fuel injection system 1 of the present embodiment implements the post-injection suspending pattern in the period for performing the post-injection operation in the non-overlapping cylinders #2, #5. Thus, the post-injections C2, C5 of the non-overlapping cylinders #2, #5 are suspended. As a result, a further decrease in the common rail pressure PC due to the post-injections C performed after the normal injections in the non-overlapping cylinders #2, #5 can be prevented.

The fuel injection system 1 of the present embodiment implements the post-injection suspending pattern also in the overlapping cylinders #1, #4, in which the normal injections are performed immediately before the normal injections in the non-overlapping cylinders #2, #5 respectively, out of the overlapping cylinders #1, #3, #4, #6. In the present embodiment, as shown in FIGS. 4B and 4C, the injection timing of the post-injection C substantially coincides with the injection timing of the next normal injection (the main injection A and the pilot injection B). Therefore, the next normal injection performed next to the post-injection C is influenced by a pressure pulsation, which is caused by the post-injection C. Therefore, the post-injection C is suspended in the overlapping cylinders #1, #4, in which the normal injections are performed immediately before the normal injections in the non-overlapping cylinders #2, #5 respectively. As a result, the influence of the pressure pulsation of the immediately preceding post-injections (the post-injection C1 or the post-injection C4 of the prior art) on the normal injections (the main injection A2 and the pilot injection B2 or the main injection A5 and the pilot injection B5) of the non-overlapping cylinders #2, #5, which can be greatly influenced by the pressure pulsation due to the post-injection C, can be prevented. Accordingly, the fluctuation of the normal injections of the non-overlapping cylinders #2, #5 can be inhibited.

In the injector 5 of the fuel injection system 1 of the present embodiment, the valve member 52 of the electromagnetic valve 41 is biased by the spring 53, which can exert a very large resilient force, in order to prevent the high-pressure fuel, which is supplied into the back pressure control chamber 49, from leaking through the exit-side orifice 51. Therefore, a large current is required to drive the valve member 52 against the resilient force of the spring 53, so the injector drive circuit 8 generates a large amount of heat per injection. In such a case where the large amount of heat is generated per injection, the scheme of the present embodiment of intermittently suspending the post-injection C in the period for performing the post-injection operation is specifically effective because the thermal burden of the injector drive circuit 8 can be reduced and the upper limit of the engine rotation speed set by the heat generation limit can be raised.

(Modifications)

In the above embodiment, the post-injections C3', C6' are performed in the respective cylinders #3, #6. Alternatively, the post-injection C6' of the cylinder #6 may be suspended and only the post-injection C3' of the cylinder #3 may be performed.

The post-injections C1, C4 may be performed and the post-injections C3', C6' may be suspended insofar as the injection timing of each one of the normal injections of the non-overlapping cylinders #2, #5 is distant from the injection timing of each one of the post-injections C1, C4 enough to avoid the influences of the pressure pulsation due to the post-injections C1, C4 of the cylinders #1, #4 on the normal injections of the non-overlapping cylinders #2, #5.

In the above embodiment, the heat generation of the injector drive circuit 8 is suppressed by cyclically suspending the post-injection C. Alternatively, other sort of injection than the post-injection C may be suspended insofar as the suspension of the injection does not affect the output of the engine 3.

In the above embodiment, each injection is performed based on the injection timing and the injection period. Alternatively, an injection quantity may be calculated instead of the injection period and the injection may be performed based on the injection timing and the injection quantity, for instance.

The fuel injection system 1 of the above embodiment is specified to perform six injections and four pressure-feeding operations in every two cycles of the engine 3 as shown in FIG. 5. Alternatively, the present invention may be applied to a fuel injection system specified to perform six injections and three pressure-feeding operations or four injections and four pressure-feeding operations during every two cycles of the engine 3.

The fuel injection system 1 of the above embodiment is specified to perform the normal injection once in each one of the pressure-feeding periods F1, F2, F3, F4 as shown in FIG. 5. Alternatively, the invention may be applied to a fuel injection system specified to perform two or more normal injections in one pressure-feeding period, for instance.

The fuel injection system 1 of the above embodiment is the pressure accumulation type fuel injection system including the common rail 2. Alternatively, the present invention may be applied to a fuel injection system, in which fuel pressure-fed by the fuel supply pump 4 is directly injected into the cylinders.

The injector 5 of the fuel injection system 1 of the above embodiment is an indirect drive type injector, which indirectly drives the needle 38 by releasing the back pressure from the back pressure control chamber 49 and opens the injection hole 39. Alternatively, the present invention may be applied to a direct drive type injector, which opens the injection hole 39 by directly driving the needle 38.

The driving current of the fuel injection system 1 of the above embodiment is generated by the power supplied from the battery. Alternatively, the driving current may be generated by using a piezoelectric element and the like.

The present invention should not be limited to the disclosed embodiment, but may be performed in many other ways without departing from the spirit of the invention.

What is claimed is:

1. A fuel injection system of an engine, comprising:
   a fuel supply pump for pressure-feeding fuel;
   a common rail that accumulates the fuel pressure-fed from the pump at a high pressure;
   a plurality of injectors mounted to cylinders of the engine, the injectors of the respective cylinders being connected to the common rail and injecting the accumulated fuel, if an actuator is energized;
   injection controlling means for outputting a normal injection command signal for performing a normal injection, which is performed to obtain engine torque; and
   injector driving means for performing energization of the actuator responsive to the command signal outputted by the injection controlling means, wherein
   the injection controlling means outputs a post-injection command signal for performing a post-injection for supplying unburned gas into exhaust gas of the engine after the normal injection when the injection controlling means performs post-injection operation,
   the injection controlling means intermittently implements a post-injection suspending pattern for suspending the output of the post-injection command signal in a period for performing the post-injection operation, after outputting the normal injection command signal, and
   the injection controlling means implements the post-injection suspending pattern in a period during which a pressure-feeding period of the fuel supply pump for pressure-feeding the fuel and an injection period of the normal injection do not overlap.

2. The fuel injection system as claim 1, wherein
   the injection controlling means, if there are a plurality of overlapping cylinders, in which the pressure-feeding period of the fuel supply pump and the injection period of the normal injection overlap, selects one or more overlapping cylinders, which are smaller in number than the entire overlapping cylinders, and implements a post-injection performing pattern for outputting the post-injection command signal only to the one or more selected overlapping cylinders after outputting the normal injection command signal.

3. The fuel injection system as in claim 2, wherein
   the injection controlling means, if there is a non-overlapping cylinder, in which the pressure-feeding period of the fuel supply pump and the injection period of the normal injection do not overlap, and if the normal injections are performed successively in the two or more overlapping cylinders, implements the post-injection suspending pattern in an immediately preceding overlapping cylinder, in which the normal injection is performed immediately before the normal injection performed in the non-overlapping cylinder.

4. The fuel injection system as in claim 1, wherein
   the engine leads the unburned gas generated by the post-injection operation into a filter for collecting particulate matters included in the exhaust gas, and burns the unburned gas with the particulate matters collected by the filter.

5. A method of injecting fuel in a fuel injection system of an engine that includes a fuel supply pump for pressure-feeding fuel, a common rail that accumulates the fuel pressure-fed from the pump at a high pressure, a plurality of injectors mounted to cylinders of the engine and connected to the common rail to inject the accumulated fuel, the method comprising:
   outputting a normal injection command signal for performing a normal injection, which is performed to obtain engine torque;
   energizing an actuator responsive to the command signal;
   outputting a post-injection command signal for performing a post-injection for supplying unburned gas into exhaust gas of the engine after the normal injection as a post-injection operation; and
   intermittently implementing a post-injection suspending pattern for suspending the output of the post-injection command signal in a period for performing the post-injection operation, after outputting the normal injection command signal, the post-injection suspending pattern being implemented in a period during which a pressure-feeding period of the fuel supply pump for pressure-feeding the fuel and an injection period of the normal injection do not overlap.

6. The method as in claim as in claim 5, comprising, if there are a plurality of overlapping cylinders in which the pressure-feeding period of the fuel supply pump and the injection period of the normal injection overlap, selecting one or more overlapping cylinders, which are smaller in number than the entire overlapping cylinders, and implementing a post-injection performing pattern for outputting the post-injection command signal only to the one or more selected overlapping cylinders after outputting the normal injection command signal.

7. The method as in claim 6, comprising, if there is a non-overlapping cylinder in which the pressure-feeding period of the fuel supply pump and the injection period of the normal injection do not overlap and if the normal injections are performed successively in the two or more overlapping cylinders, implementing the post-injection suspending pattern in an immediately preceding overlapping cylinder, in which the normal injection is performed immediately before the normal injection performed in the non-overlapping cylinder.

8. The method as in claim 5, comprising leading the unburned gas generated by the post-injection operation into a filter for collecting particulate matters included in the exhaust gas, and burning the unburned gas with the particulate matters collected by the filter.

* * * * *